United States Patent Office 3,088,245
Patented May 7, 1963

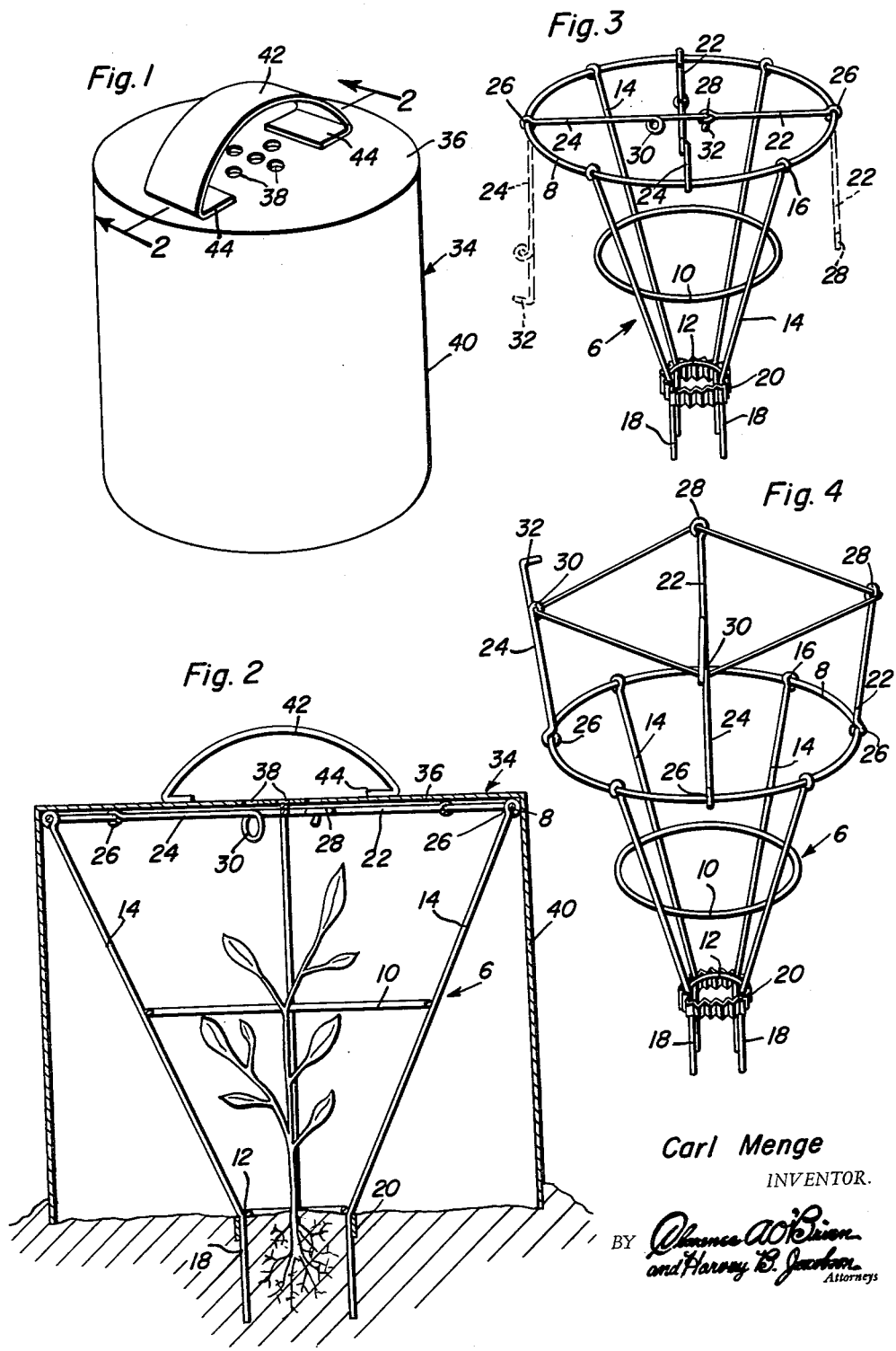

3,088,245
PLANT GUARD AND SUPPORT
Carl Menge, 19 3rd Ave. NW., Beulah, N. Dak.
Filed Dec. 15, 1961, Ser. No. 159,595
3 Claims. (Cl. 47—47)

This invention relates, generally speaking, to supports and protectors for plants and flowers and has to do with an improved trellis-type guard and, in combination therewith, an optionally usable economical hood which is removably mounted on and covers said guard.

Persons conversant with the art to which the invention relates are aware that prior art adaptations are of many and varied styles and types and are categorized as plant protectors, trellises, supports, guards and the like. The instant advance is generally analogous to the ball trellis and plant protector Patent 2,009,867 and also the hooded protector shown in the McWhirter Patent 1,611,759. With these leads and guides in mind the category and general character of the present invention will be evident.

One object of the present invention is to provide a cage-like guard or frame which is unique in that instead of being circular in cross-section, is conical or funnel-shaped in form, whereby to permit the guards to be nested, stacked and handled in a compact and convenient manner and with a view toward expediting such matters as have to do with transportation, handling and storing.

The invention also features an openwork trellis-like frame or cage which lends itself to practical construction from bendable stout wires or rods, said frame embodying horizontal vertically spaced hoops connected together by complemental rods and defining a unique openwork frame.

The invention further features a rigid rod-type or equivalent frame wherein the lower ends of the rods provide ground penetrating tines or anchors equipped with a non-corrodible collar to afford protection to the root system of the encaged plant.

The invention also relies for novelty on an openwork wire or an equivalent plant enclosing cage and the combination therewith of a paper, plastic or an equivalent economical hood or shield. The latter has a bail-type handle, ventilating holes in the top and is removably fitted over the frame in a manner to be specifically hereinafter described. The upper or top portion of the frame is protion of the frame is provided with a novel openable and closable, as well as extensible closure expressly designed and functioning to cope with tall-growing plant needs.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a view in perspective of the invention, the guard or trellis-like frame aptly encased and concealed by the enveloping hood;

FIGURE 2 is a section on a larger scale with parts in elevation the section being on the line 2—2 of FIGURE 1;

FIGURE 3 is a view in perspective of the frame with the hood removed and with certain of the component parts shown in dotted lines; and FIGURE 4 is a view in perspective similar ot FIGURE 3 showing how the closing fingers at the top are swung up and tied together with a cord to maintain them in linked upstanding relationship.

Referring now to the drawing and with reference in particular to FIGURES 3 and 4 the numeral 6 designates the guard, more specifically, the openwork frame or trellis. This frame is constructed from suitably cut lengths of stout wire or bendable rods. The topmost member comprises a hoop 8 below which is a second companion hoop 10 and below which is a third hoop 12. These hoops are progressively or gradually reduced in diameter and they are connected together by vertical legs or rods 14. The rods are each the same in construction the upper end of each rod being fashioned into an eye 16 which is clenched around the hoop 8. The median and lower portions of each rod are welded or otherwise fixedly joined to the intermediate and lower hoops 10 and 12. The lower ends of the rods depend in vertical parallelism below the ring 12 and provide anchoring tines or prongs 18. These prongs enter the ground when shoved into position as illustrated in FIGURE 2. If and when desired a corrugated collar 20 is provided, this being removable and surrounding the exterior portions of the prongs 18. The purpose of this collar is to afford protection to the root system of the plant and especially protection against damage from cutworms and other pests too numerous to mention. Manifestly, the framework may be made up of more or less hoops and, in addition, the manufacturer may prefer to use four legs or rods 14 for the small and medium sized frames or guards and six more or less for the larger ones.

The top hoop 8 is provided with normally closed closure means which may be, speaking generally, referred to as cruciform in plan. More particularly the construction comprises two relatively short fingers 22 and two relatively long complemental fingers 24. All of the fingers have bent eyes 26 at their attachable ends which are hingedly joined to the hoop at equidistant circumferentially spaced points. The shorter fingers 22 terminate at their outer ends in keeper eyes 28. Each long finger 24 is bent upon itself between its ends to provide a line passing eye 30 while the free terminal end is laterally bent at 32 to provide a hook. With the respectively paired eye-equipped fingers in proper circumferential order and relationship it will be seen that the two positions of the fingers depicted in full lines in FIGURES 3 and 4 may be employed.

In FIGURE 3 the keeper hooks 32 are engaged with the keeper eyes 28 and the fingers are then in cruciform relationship to provide a satisfactory top closure for the frame. By releasing the hooks from the keepers and swinging the arms or fingers 22 and 24 up to the extended position in relationship depicted in FIGURE 4 the user may lace or thread a piece of cord or wire through the fingers 28 and 30 and thus keep the fingers projecting upwardly and maintain effective support properties of the frame. It may be perhaps incidental but it can be mentioned, too, that the fingers may be hung down to the out-of-the-way position (see the dotted lines in FIGURE 3) by merely disengaging the fingers and following the necessary procedural steps to accomplish this result.

The shield or hood may be made from economical sheet material, perhaps wax coated transparent paper or a suitable grade of commercial plastics. The hood is in the nature of a cap and is denoted generally by the numeral 34 and comprises a disk-like top wall 36 with a plurality of central watering and ventilating holes 38 at the center. The depending wall or skirt portion is denoted at 40. This hood has a bail or handgrip 42 which is attached to the top wall. The end portions 44 of the handgrip are turned inwardly and glued or otherwise secured in place. It should be noted that the material forming the handle or handgrip 42 is sufficiently wide that it, if desired, can be collapsed or folded downwardly (not shown) in a manner to temporarily cover and close the holes 38.

The foregoing is considered as illustrative only of the principles of the invention. Further, since numerous modifications and changes will readily occur to those skilled in the art, it is not desired to limit the invention to the exact construction and operation shown and described and accordingly all suitable modifications and equivalents may be resorted to, falling within the scope of the invention as claimed.

What is claimed as new is as follows:

1. A plant encasing and supporting trellis comprising a frame structure embodying a plurality of horizontal vertically disposed hoops, vertical circumferentially spaced rods connected with said hoops and having lower end portions extending below the normal bottom of the frame and constituting ground-penetrating and anchoring tines, cooperating fingers hingedly mounted at outer ends on an upper one of said hoops, said fingers having free terminal ends provided with alignable eyes, a linking cord threaded through said eyes and supporting the fingers in an upstanding position, certain of said eyes constituting keepers, the free ends of certain other fingers having terminal keeper hooks which are releasably engageable with their respectively intended keepers when the fingers are all in a horizontal position atop the frame structure.

2. A plant encasing and supporting trellis comprising a funnel-shaped frame structure embodying a top hoop, a relatively small bottom hoop in a plane in parallelism below the top hoop, an intermediate hoop spaced from and in a plane between the top and bottom hoops, said intermediate hoop being of a diameter less than the diameter of the top hoop and of a diameter greater than the diameter of the bottom hoop, a plurality of circumferentially spaced rods having upper end portions connected to the top hoop, having median portions connected to the outer perimeter of the intermediate hoop, and lower converging end portions connected to the outer periphery of the bottom hoop, the terminal lower ends of said rods being straight and depending in parallelism below the plane of the bottom hoop and constituting ground penetrating prongs, a relatively narrow corrugated collar embracing the upper end portions of the prongs with its upper edge in a plane below the plane of the bottom hoop and its lower edge in a plane well above the terminal lower ends of said prongs, a plurality of circumferentially spaced cooperating fingers having outer ends hingedly connected to said top hoop, certain of said fingers having free terminal ends providing alignable eyes for passage of a linking cord, the free ends of certain of the other fingers having laterally bent terminal hooks which are releasably engaged with the eyes which are provided therefor.

3. A plant encasing and supporting trellis comprising a funnel-shaped frame structure embodying a top hoop, a relatively small bottom hoop in a plane in parallelism below the top hoop, an intermediate hoop spaced from and in a plane between the top and bottom hoops, said intermediate hoop being of a diameter less than the diameter of the top hoop and of a diameter greater than the diameter of the bottom hoop, a plurality of circumferentially spaced rods having upper end portions connected to the top hoop, having median portions connected to the outer perimeter of the intermediate hoop, and lower converging end portions connected to the outer periphery of the bottom hoop, the terminal lower ends of said rods being straight and depending in parallelism below the plane of the bottom hoop and constituting ground penetrating prongs, and a relatively narrow corrugated collar embracing the upper end portions of the prongs with its upper edge in a plane slightly below the plane of the bottom hoop and its lower edge in a plane well above the terminal lower ends of said prongs.

References Cited in the file of this patent

UNITED STATES PATENTS

| 78,037 | Wilcox | May 19, 1868 |
| 212,604 | Jenks | Feb. 25, 1879 |
| 1,536,678 | Markowski | May 5, 1925 |
| 1,764,442 | Hansen | June 17, 1930 |